United States Patent
Richter et al.

(10) Patent No.: US 7,627,953 B2
(45) Date of Patent: Dec. 8, 2009

(54) CALIBRATING BODY, GAGE OR MEASURING DEVICE, PREFERABLY SCREW-THREAD MEASURING DEVICE AND METHOD OF PRODUCTION THEREOF

(75) Inventors: Norbert Richter, Augsburg (DE); Stefan Baumann, Augsburg (DE); Bodo Benitsch, Buttenwiesen (DE); Thomas Schmidt, Thierhaupten (DE); Franz Fendt, Langweid (DE)

(73) Assignee: SGL Carbon AG, Meitingen (DE)

( * ) Notice: Subject to any disclaimer, the term of this patent is extended or adjusted under 35 U.S.C. 154(b) by 335 days.

(21) Appl. No.: 11/820,145

(22) Filed: Jun. 18, 2007

(65) Prior Publication Data

US 2007/0266572 A1 Nov. 22, 2007

Related U.S. Application Data

(63) Continuation of application No. PCT/EP2005/013248, filed on Dec. 9, 2005.

(51) Int. Cl.
*G01B 5/16* (2006.01)
*C04B 35/52* (2006.01)

(52) U.S. Cl. .......................... 33/199 R; 33/542; 501/99
(58) Field of Classification Search ............... 33/199 B, 33/199 R, 501, 542, 567; 29/595; 156/1; 501/99
See application file for complete search history.

(56) References Cited

U.S. PATENT DOCUMENTS

| 4,097,294 | A | * | 6/1978 | Rice et al. ...................... 501/92 |
| 5,354,398 | A | * | 10/1994 | Kawai .......................... 156/245 |
| 6,030,913 | A | | 2/2000 | Heine et al. |
| 6,833,163 | B1 | | 12/2004 | Krenkel et al. |
| 7,490,411 | B2 | * | 2/2009 | Matsumiya et al. ....... 33/199 R |
| 2001/0022034 | A1 | | 9/2001 | Krenkel et al. |
| 2002/0090873 | A1 | * | 7/2002 | Moody ........................ 442/268 |
| 2004/0097360 | A1 | | 5/2004 | Benitsch et al. |
| 2007/0148888 | A1 | * | 6/2007 | Krull et al. ................... 438/306 |
| 2007/0240318 | A1 | * | 10/2007 | Matsumiya et al. ....... 33/199 R |
| 2007/0271804 | A1 | * | 11/2007 | Kuhman et al. ............... 33/542 |

FOREIGN PATENT DOCUMENTS

| DE | 197 10 105 A1 | 9/1998 |
| DE | 100 03 176 A1 | 8/2001 |
| EP | 1 464 634 A2 | 10/2004 |

* cited by examiner

*Primary Examiner*—G. Bradley Bennett
(74) *Attorney, Agent, or Firm*—Laurence A. Greenberg; Werner H. Stemer; Ralph E. Locher

(57) ABSTRACT

A method of producing a calibrating body, gage or measuring device, preferably a screw-thread measuring device, at least partially including a C—SiC material constructed of a porous, carbon-containing material with infiltrated liquid Si, includes converting the Si at least partially to SiC by reaction with carbon. The C—SiC material is produced from a C—C material based on carbon felt material produced by pressing monofibers or fiber fragments irregularly entwined with each other. A calibrating body, gage or measuring device, preferably a screw-thread measuring device, is also provided.

19 Claims, 2 Drawing Sheets

CALIBRATING BODY, GAGE OR MEASURING DEVICE, PREFERABLY SCREW-THREAD MEASURING DEVICE AND METHOD OF PRODUCTION THEREOF

CROSS-REFERENCE TO RELATED APPLICATIONS

This is a continuation, under 35 U.S.C. § 120, of copending International Application No. PCT/EP2005/013248, filed Dec. 9, 2005, which designated the United States; this application also claims the priority, under 35 U.S.C. § 119, of German Patent Application 10 2004 061 438.5, filed Dec. 17, 2004; the prior applications are herewith incorporated by reference in their entirety.

BACKGROUND OF THE INVENTION

Field of the Invention

The invention relates to a calibrating body, gage or measuring device, preferably a screw-thread measuring device, at least partially including a C—SiC body constructed of a porous, carbon-containing material with infiltrated liquid Si, with the Si converted at least partially to SiC by reaction with carbon. The invention also relates to a method of producing the calibrating body, gage or measuring device, preferably a screw-thread measuring device.

A calibrating body or a gage will be understood to mean, hereinafter, a solid gage for assessing, by comparison, whether or not a structure or a component complies with the solid gage or for calibrating a measuring device. Measuring devices are, conversely, devices that measure the actual dimensions of a structure or of a component or provide values from which they can be derived.

A calibrating body of that type and a method of that type are known from German Published, Non-Prosecuted Patent Application DE 100 03 176 A1, corresponding to U.S. Pat. No. 6,833,163 and U.S. Patent Application Publication No. US 2001/0022034. In order to produce the C/C—SiC material described therein, carbon fibers are used in the form of woven or knitted mats. In accordance with that reference, a fiber length shorter than 3 mm causes an increased reaction of the fibers with the liquid silicon while forming SiC. U.S. Patent Application Publication No. US 2004/0097360 A1 also discloses a C/C—SiC-material for calibrating bodies for which carbon fiber bundles are used as a starting basis. Those carbon fibers, which have not taken part in the reaction with Si, are embedded in the matrix of the C/C—SiC material and help to increase the ductility of the material. Moreover, the total proportion of Si and SiC is at most 60 vol. %. That results in a material which, due to its relatively low local hardness and ductility caused by the fibers, is unable to meet higher requirements for wear resistance, which play an important role for calibrating bodies and measuring devices that come into repeated sliding and rubbing contact with the structure that is to be inspected or measured.

SUMMARY OF THE INVENTION

It is accordingly an object of the invention to provide a calibrating body, a gage or measuring device, preferably a screw-thread measuring device and a method of production thereof, which overcome the hereinafore-mentioned disadvantages of the heretofore-known devices and methods of this general type and with which higher wear resistance is obtained.

With the foregoing and other objects in view there is provided, in accordance with the invention, a method of producing a calibrating body, gage or measuring device, preferably a screw-thread measuring device at least partially comprising a C—SiC material constructed of a porous, carbon-containing material with infiltrated liquid Si and converting the Si at least partially to SiC by reaction with carbon. The C—SiC material is produced from a C—C material based on carbon felt material produced by pressing monofibers or fiber fragments irregularly entwined with each other.

With the objects of the invention in view, there is also provided a calibrating body, gage or measuring device, preferably a screw-thread measuring device at least partially comprising C—SiC material constructed of a porous, carbon-containing material with infiltrated liquid Si, the Si being converted at least partially to SiC by reaction with carbon. The C—SiC material is substantially free of carbon fibers and has a proportion of Si and SiC between 70 wt. % and 90 wt. % and a proportion of carbon between 10 wt. % and 30 wt. %.

A felt is to be understood in the following as a material produced by compression of randomly intertwined individual fibers or fiber fragments. Compared with the carbon mats used in the state of the art, with densely packed bundles of fibers (Rorings or Roring segments) of parallel fibers or filaments, such a carbon felt has a lower density and consequently more room between the fibers for the infiltrated silicon, so that due to the larger reaction area available, substantially all of the carbon of the felt reacts during Si liquid infiltration to form SiC (silicon carbide). The result is a body with a matrix formed from the three components C, Si, and SiC, whereas because of the almost complete reaction of the carbon felt in the matrix, preferably no or almost no carbon constituents are still present, which could have an adverse effect on wear resistance, since they increase the ductility of the material. This matrix-dominant material is very suitable, due to its good wear resistance, for use in calibrating bodies, gages or measuring devices, which, or components of which, come repeatedly into sliding and rubbing contact with the structure being inspected.

Other features which are considered as characteristic for the invention are set forth in the appended claims.

Although the invention is illustrated and described herein as embodied in a calibrating body, a gage or measuring device, preferably a screw-thread measuring device and a method of production thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
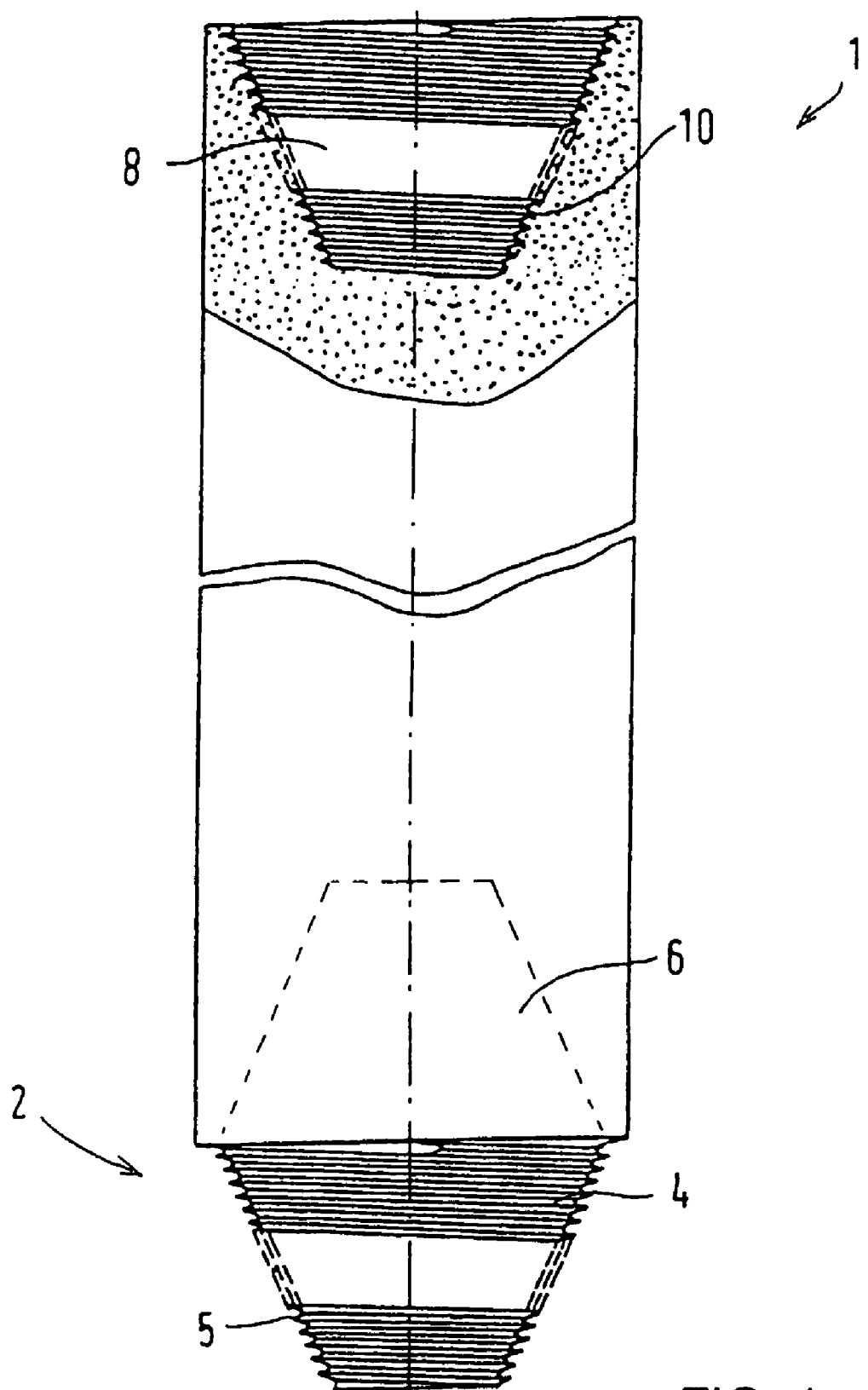
FIG. 1 is a diagrammatic, side-elevational view of an electrode with a tapering internal thread and a nipple with a tapering external thread.

Referring now to the figures of the drawings in detail and first, particularly, to FIG. 1 thereof, there is seen a segment of a graphite electrode labeled generally with reference numeral 1, which is used for conducting current during melting of electric steel in an electric arc furnace. Since the graphite electrode is also consumed over time under the action of the electric arc, graphite electrode segments 1 must be supplied continually on the side facing away from the arc, which is achieved by screwing a new graphite electrode segment 1 onto the segment currently in use, using a screw-thread connection 2. The screw-thread connection 2 includes a preferably separate, double-conical nipple 4 with an external thread 5, one half of which, in FIG. 1, is screwed into an internal thread of a tapering blind hole 6 in the graphite electrode segment 1, which is otherwise identical to, but is a mirror image of, another tapering blind hole 8 with an internal thread 10, shown in an exploded view in FIG. 1. It can easily be seen that a graphite electrode segment 1 is then continually screwed onto the segment currently in use in an almost endless series, thus ensuring feed of electrode material that is required for a continuous melting process.

Since the graphite electrode segments I have a relatively large size and are positioned and screwed together manually or by robots, the construction of the internal thread 10 as a tapering thread is advantageous due to the then centering effect and quick accomplishment of the screwing operation. In order to ensure a safe, rigid connection and alignment of the central axes without any large shaft angle deviations of the graphite electrode segments 1 that are screwed together, it is necessary for the screw-thread connection 2 to meet certain manufacturing tolerances with respect to defined values characterizing this connection, such as, for example, the taper angle and the maximum diameter of the tapering blind hole 8.

Figure 2:
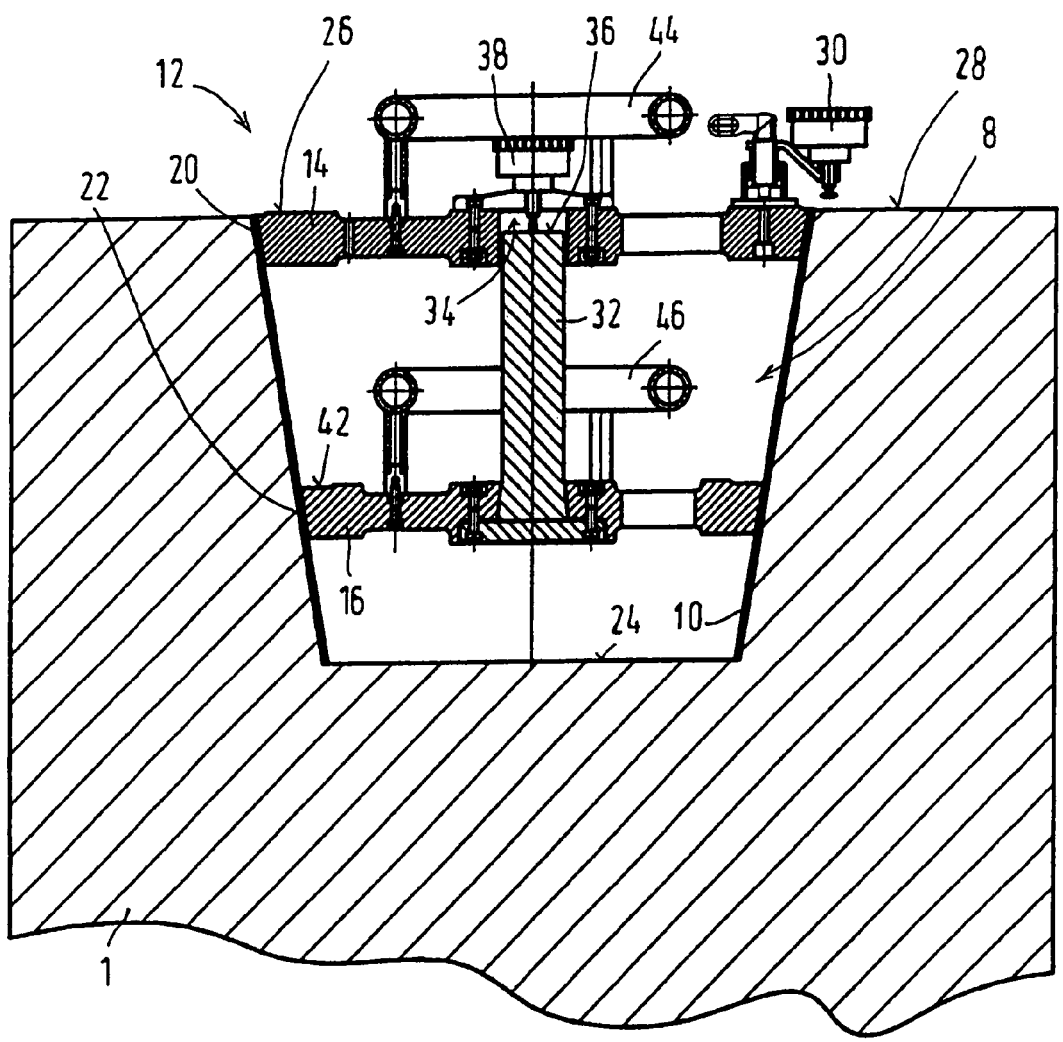
FIG. 2 is an enlarged, fragmentary, cross-sectional view of a screw-thread measuring device for measuring a tapering internal thread of the electrode, which contains SiC bodies, that were produced according to a preferred embodiment of the method according to the invention.

Tolerance is checked by using a screw-thread measuring device 12 shown in FIG. 2, which includes two circular disks 14, 16 with different diameters, the radially outer peripheral surfaces of which are constructed to be tapering and complementary, for example to the blind hole 8 that is to be inspected, and are each provided with an external thread 20, 22, so that first the smaller, lower disk 16 in FIG. 2 and then the larger, upper disk 20 in FIG. 2, can be screwed into the blind hole 8. Moreover, the diameter of the larger disk 14 is preferably dimensioned in such a way that in the fully screwed-in state its outer surface 26 pointing away from the bottom 24 of the blind hole 8 is approximately coplanar with a level end face 28 of the graphite electrode segment 1, at least in the region of the rim of the blind hole 8. The larger disk 14 carries on its outer surface 26 a first dial gage 30, with which the depth to which it is screwed in, relative to a reference surface, which is preferably formed by the end face 28 of the graphite electrode segment 1, can be determined as a first characteristic dimension.

Furthermore, the two disks 14, 16 are joined together by a pin 32, which is positioned centrally and perpendicularly on the smaller disk 16 and fits into a central through-opening 34 in the larger disk 14 with a small clearance. When the smaller disk 16 is likewise screwed in fully, an end face 36 of the pin 32 points away from the bottom 24 of the blind hole 8, not quite reaching the plane of the outer surface 26 of the larger disk 14. Therefore, a second characteristic dimension is present, that depends on the relative position of the two disks 14, 16 or on the screwed-in depth of the smaller disk 16, and which can be detected by a second dial gage 38 carried by the larger disk 14. It is then possible, for example, to calculate the taper angle and the maximum diameter of the tapering blind hole 8 and/or of the internal thread 10 as a function of the two characteristic dimensions.

In order to manipulate the screw-thread measuring device 12, hand-grips 44, 46 of the two disks 14, 16, preferably made of aluminum, are fitted to the respective surfaces 26, 42 of the blind hole 8 pointing away from the bottom 24. Since the graphite electrode segments 1 and in particular their screw-thread connections 2 are regularly checked with respect to their dimensional stability, it is necessary to screw the screw-thread measuring device 12 into blind holes 8 once again for measurement, whereby the external threads 20, 22 of the two disks 14, 16 come into sliding and rubbing contact with the internal threads 10. Excessive wear on the radially outer peripheral surfaces of the two disks 14, 16 would then result in a larger screwed-in depth and thus give an incorrect measurement result. Accordingly, high wear resistance of the two disks 14, 16 is desirable.

For this reason, preferably at least the threaded zones of the two disks 14, 16 of the screw-thread measuring device 12 are made from a particularly wear-resistant material, the production of which is described below.

The two disks 14, 16, at least in the threaded zone, both include SiC bodies, constructed of a porous, carbon-containing material with infiltrated liquid Si, with the Si converted at least partially to SiC by reaction with carbon. The SiC bodies 14, 16 are produced from a C—C material based on carbon felt material and/or fine-pore and open-pore carbon structures and/or based on pyrolyzed wood.

The carbon felt material can, for example, be a rayon felt, a polyacrylonitrile (PAN) felt or a viscose felt or a combination of these materials. The carbon felt material can have a layered structure, i.e. the felt can be built up in several parallel layers to form boards of a defined thickness. However, the felt material can also be formed randomly.

According to a particularly preferred embodiment of the production process, carbon felt material is used and is impregnated with a polymer, preferably phenolic resin, and cured, producing boards of plastic with interspersed carbon fibers (CFP). Then these CFP intermediate products are carbonized or pyrolyzed. The carbonization or pyrolysis temperature is preferably in a range of from 900° C. to 1000° C. This process step can be repeated several times. Based on the number of so-called redensifications including re-impregnation and carbonization, it is possible to adjust the porosity of the CFP boards, as the pore size decreases through re-impregnation with phenolic resin and subsequent carbonization. A consequence of using layered felt material as a starting product is that the CFP boards manufactured therefrom may display anisotropic material properties due to the horizontal parting planes between the felt layers. However, this is not of decisive importance for the intended use as disk material in screw-thread measuring devices.

Alternatively, to minimize or completely exclude anisotropy of the material, the felt can be ground, so that the layered structure of the material is broken down. The resultant felt particles can be mixed with resin and compressed to form CFP boards. In order to eliminate any other volatile constituents from the pyrolyzed boards, the boards are preferably graphitized, with the graphitization temperature being at a maximum of 3000° C.

Because the C—C material is relatively soft as compared with the C—SiC material obtained after the last production step, the C—C boards are machined close to the final contour, which means in the present case that the two disks 14, 16 with diameters substantially close to the final shape are produced from the boards.

Next, the C—C disks 14, 16 are converted to disks 14, 16 of C—SiC material by infiltration of liquid Si. The carbon is then converted to SiC at least partially, and ideally completely by reaction with Si, resulting in a ceramic body formed from the three components SiC, Si and C, and due to the almost complete reaction of the carbon with the infiltrated Si, no or almost no carbon is still present. The material structure is very fine, and the density of the C—SiC bodies 14, 16 is, for example, 2.7 g/cm$^3$.

The C—SiC disks 14, 16, which are substantially free from carbon fibers, have a proportion of Si and SiC between 70 wt. % and 90 wt. % and a proportion of carbon between 10 wt. % and 30 wt. %. Preferably, the proportion of Si can be between 30 wt. % and 35 wt. %, the proportion of SiC between 50 wt. % and 60 wt. % and the proportion of carbon between 10 wt. % and 15 wt. %.

Tables 1.1 and 1.2 show selected mechanical and thermal properties of the C—SiC material of the disks 14, 16, when carbon felt with a layered structure is used as the starting material.

TABLE 1.1

Mechanical properties

| Parameter | Temperature | Unit | Typical value |
|---|---|---|---|
| Density | | g/cm$^3$ | 2.7 |
| Tensile strength | 20° C. | MPa | 80 |
| | 1200° C. | MPa | 80 |
| Tensile modulus | 20° C. | GPa | 230 |
| | 1200° C. | GPa | 230 |
| Elongation at rupture | | % | 0.04 |
| Bending strength (3-point) | 20° C. | MPa | 150 |
| | 1200° C. | MPa | 130 |
| Bending modulus (3-point) | 20° C. | GPa | 150 |
| | 1200° C. | GPa | 110 |
| Compressive strength | 20° C. | MPa | 1300 |
| | 1200° C. | MPa | 1300 |
| Tear strength | | K$_{1C}$ | 5 |
| Weibull modulus | | m | 25 |

TABLE 1.2

Thermal properties

| Parameter | Temperature | Unit | Typical value |
|---|---|---|---|
| Maximum service temperature | | ° C. | 1350 |
| Thermal shock resistance | | K/s | 2100 |
| Thermal expansion | 0° C. ... 300° C. | 10$^{-6}$/K | 3.5 |
| | 300° C. ... 1200° C. | 10$^{-6}$/K | 4.5 |
| Thermal conductivity | 20° C. | W/m · K | 125 |
| | 1200° C. | W/m · K | 80 |
| Specific heat capacity | 20° C. | J/g · K | 0.8 |
| | 1200° C. | J/g · K | 1.2 |

Tables 2.1 and 2.2 show the mechanical and thermal properties of the C—SiC material of the disks 14, 16, when CFP boards are compressed from ground carbon felt.

In the last process step, the two disks 14, 16 are machined to the final diameter by grinding and the external thread 20, 22 is ground-in.

Any fine-pore and open-pore carbon structures and/or pyrolyzed wood can be used as the starting material instead of carbon felt. The invention therefore proposes, for the first time, the use of C—SiC material based on carbon felt and/or fine-pore and open-pore carbon structures and/or based on pyrolyzed wood for calibrating bodies, gages and measuring devices or for their components, in order to increase wear resistance, and is not limited to application in screw-thread measuring devices.

TABLE 2.1

Mechanical properties

| Parameter | Temperature | Unit | Typical value |
|---|---|---|---|
| Density | | g/cm$^3$ | 2.60-2.70 |
| Elongation at rupture | 20° C. | % | 0.06 |
| Bending strength $\sigma_B$ (4-point) | 20° C. | MPa | 135 |
| Bending modulus of elasticity (4-point) | 20° C. | GPa | 205 |
| Weibull modulus | | m | 19 |

TABLE 2.2

Thermal properties

| Parameter | Temperature | Unit | Typical value |
|---|---|---|---|
| Thermal expansion (measured) | | | |
| in plane | 20 K to RT | 10$^{-6}$/K | 0.75 |
| orthogonal | 20 K to RT | 10$^{-6}$/K | 0.70 |

The invention claimed is:

1. A method of producing a calibrating body, gage, measuring device or screw-thread measuring device, the method comprising the following steps:
   providing an at least partially C—SiC material constructed of a porous, carbon-containing material with infiltrated liquid Si and converting the Si at least partially to SiC by reaction with carbon; and
   producing the C—SiC material from a C—C material based on carbon felt material produced by pressing monofibers or fiber fragments irregularly entwined with each other.

2. The method according to claim 1, wherein the carbon felt material contains a rayon felt, a polyacrylonitrile (PAN) felt, a viscose felt or a combination thereof.

3. The method according to claim 2, which further comprises providing the carbon felt material with a layered structure.

4. The method according to claim 1, wherein the carbon felt material is impregnated with a polymer, compressed, cured and carbonized at least once, to form a carbon material interspersed with carbon.

5. The method according to claim 4, wherein a carbonization temperature is in a range of from 900° C. to 1,000° C.

6. The method according to claim 4, wherein the polymer is formed of a phenolic resin.

7. The method according to claim 4, which further comprises using the carbon felt material in ground form.

8. The method according to claim 4, which further comprises graphitizing the carbon material with interspersed carbon.

9. The method according to claim 8, wherein a graphitization temperature is at most 3,000° C.

10. The method according to claim 4, which further comprises machining the carbon material with interspersed carbon close to a final contour.

11. The method according to claim 10, which further comprises converting the carbon material with interspersed carbon, machined close to the final contour, to the C—SiC material by infiltration of liquid Si.

12. The method according to claim 11, which further comprises subjecting the C—SiC material to final machining into a C—SiC body.

13. A calibrating body, gage, measuring device or screw-thread measuring device, comprising:

an at least partially C—SiC material constructed of a porous, carbon-containing material with infiltrated liquid Si, said Si being converted at least partially to SiC by reaction with carbon; and said C—SiC material being substantially free of carbon fibers and having a proportion of Si and SiC between 70 wt. % and 90 wt. % and a proportion of carbon between 10 wt. % and 30 wt. %.

14. The calibrating body, gage, measuring device or screw-thread measuring device according to claim 13, wherein said C—SiC material is disposed at least in a region of surfaces in contact with a medium to be inspected.

15. The calibrating body, gage, measuring device or screw-thread measuring device according to claim 13, wherein said C—SiC material has a density of 2.7 g/cm$^3$.

16. The calibrating body, gage, measuring device or screw-thread measuring device according to claim 13, which further comprises at least one screw-thread measuring device body formed of said C/SiC material as a ring, circular segment or disk with a thread for screwing to a thread to be inspected.

17. The calibrating body, gage, measuring device or screw-thread measuring device according to claim 16, wherein said threads are tapering threads.

18. The calibrating body, gage, measuring device or screw-thread measuring device according to claim 16, wherein said disk is one of two disks with different diameters being screwed to the thread being inspected in a position relative to one another and/or in relation to at least one reference surface, said position determining characteristic dimensions of the thread being inspected.

19. The calibrating body, gage, measuring device or screw-thread measuring device according to claim 18, wherein said threads are tapering threads, and at least one of said disks carries a dial gage.

\* \* \* \* \*